Oct. 2, 1923.
R. M. LOVEJOY
1,469,310
FRAME FOR VEHICLES
Filed April 25, 1922
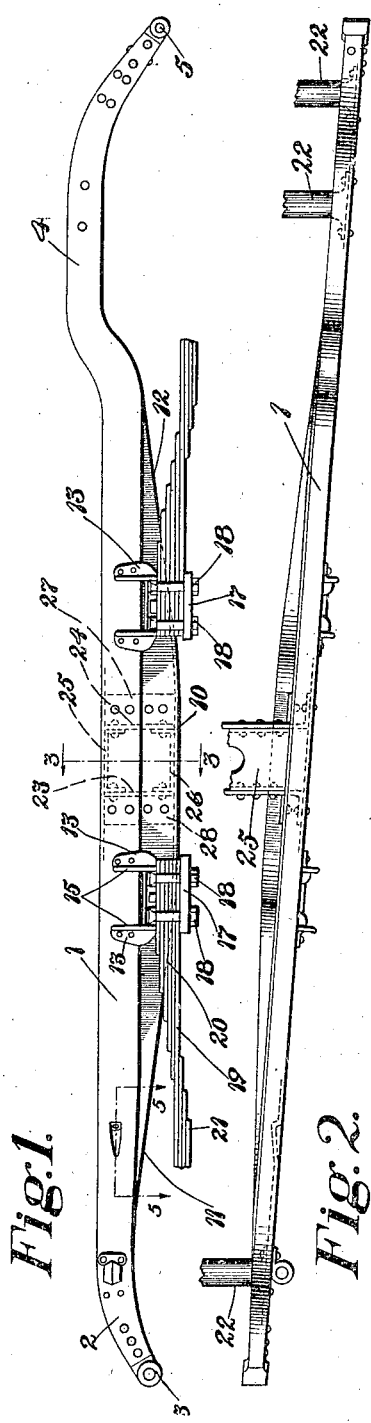
Inventor—
Ralph M. Lovejoy.
By—Heard Smith & Tennant.
Attorneys.

Patented Oct. 2, 1923.

1,469,310

UNITED STATES PATENT OFFICE.

RALPH M. LOVEJOY, OF MEREDITH, NEW HAMPSHIRE.

FRAME FOR VEHICLES.

Application filed April 25, 1922. Serial No. 556,488.

*To all whom it may concern:*

Be it known that I, RALPH M. LOVEJOY, a citizen of the United States, and resident of Meredith, county of Belknap, State of New Hampshire, have invented an Improvement in Frames for Vehicles, of which the following description, in connection with the accompanying drawing, is a specification, like characters on the drawing representing like parts.

This invention relates to improvements in vehicle frames and more particularly of the type which comprise a part of the chassis of automobiles and the object of the invention is to provide a frame of this type of more rigid construction than has heretofore been produced and better adapted to withstand both transverse and torsional strains.

A further object of the invention is to provide a frame of this character which will be somewhat wider or deeper than usual types of automobile frames, but so constructed as to permit the springs to be mounted directly under the main portion of the frame without unduly raising the frame above the plane of the axles of the vehicles or requiring an undesirable downward curvature of the ends of the frame.

More particularly the invention comprises certain improvements upon the construction disclosed in my prior application No. 431,255 filed December 16, 1920, for improvements in frames for automobiles, and the object thereof is to provide a frame which may employ side bars having relatively wide or deep median sections connected by a large tubular girder, the central widened portion of the frame being offset in such a manner that the brackets for the spring leaves may lie directly under the main portion of the frame.

A further object of the invention is to provide a frame of the character specified which may be adapted for use in a novel form of spring embodying the desirable features of both a cantilever and semi-elliptic spring, such a spring being the subject matter of my prior application No. 236,461, filed May 25, 1918, for spring constructions for vehicles.

Another object of the invention is to provide the side bars of a vehicle frame with means for permitting a member, such as a brake actuating rod, to be passed through the side frames at a relatively small angle to the plane of the side bar without weakening the side bars.

Other objects and features of the invention will more fully appear from the following description and the accompanying drawings and will be pointed out in the claims.

A preferred embodiment of the invention is illustrated in the accompanying drawings which show a sufficient portion of the side bars and other members of the frame to disclose the invention.

In the drawings:

Fig. 1 is a side elevation of one of the side bars of a vehicle frame, illustrating also portions of the springs connected thereto, and in dotted lines the form and position of a preferred type of median cross girder;

Fig. 2 is a plan view of the same, the cross girder and other connecting members being broken away;

Fig. 3 is a vertical transverse section on a plane indicated by the line 3—3, Fig. 1;

Fig. 4 is a perspective view of the front end portion of one of the side bars viewed from the inside of the frame; and, Fig. 5 is a detail horizontal sectional view on line 5—5, Fig. 1.

The present invention is illustrated herein as embodied in the frame of an automobile of a standard type although it will be understood that the invention may be employed in connection with other types of vehicles and other constructions.

The vehicle frame illustrated herein comprises a pair of complementary side bars 1 having a downwardly curved front end portion 2 provided with a suitable bracket or boss 3 for the attachment of the usual spring shackle and a rear reversely curved end portion 4 also provided at its end with a bracket or boss 5 adapted to be connected to a spring shackle. The median or central part of each side bar is provided with an offset depending portion adapted to give greater depth to the side bar and consequently greater strength and also to provide means whereby the springs may be supported directly under the main portion of the side bars.

As illustrated herein the side bar comprises a main portion which may be either in the form of an angle iron or channel comprising a vertical wall 6 and a horizontal lower wall 7 extending the full length of the frame and may also, but not necessarily, have an upper horizontal wall 8 also extending longitudinally of the frame. The median or central portion of the side bar is provided with a downwardly extending web 9 preferably integral with the lower wall 7 and desirably is provided at its lower edge with a flange which extends inwardly of the frame. This flange desirably comprises a central horizontal portion 10 and upwardly inclined portions 11 and 12 which merge respectively into the front and rear portions of the lower wall 7 of the main portion of the side bar. This central depending offset portion of the side bar adds greatly to the strength of the side bar both in respect to resistance against transverse and torsional strains.

By thus offsetting the central portion of the frame means may be provided for securing the springs of the vehicle directly beneath the main portions of the side bars.

In the preferred construction illustrated herein brackets or chairs 13 are secured to the vertical wall 6 of the side bar and are provided with bases 14 extending beneath the horizontal wall of the main portion of the side bar. The brackets 13 desirably are provided with vertical strengthening webs 15.

Suitable means are provided for clamping the springs to these brackets. As illustrated herein bolts 16, which extend downwardly from the bases of the brackets, are spaced apart a distance equal to or slightly greater than the width of the leaves of the spring. Clamping plates 17, mounted on the bolts 16, engage the under leaves of the springs and are forced into clamping position by nuts 18 on the bolts 16.

In the preferred construction the springs comprise one or more long leaves 19 having a series of progressively shorter leaves 20 superimposed thereon, the ends of the leaves 20 being clamped in the brackets above described. The spring also comprises a series of progressively shorter leaves 21 located beneath the main leaf or leaves 19. The opposite end of the leaf 19 is connected by a spring shackle (not shown) to the bracket or boss upon the downwardly curved end of the side bar.

The side bars may be secured together at their ends by any suitable spacing means, such as, tubular members 22. The central portions, however, of the side bars desirably are secured by a tubular member, preferably rectangular in form, having its ends conforming to, and preferably fitting, the contour of the main and offset central portions of the side bars.

As illustrated herein the tubular connecting member or girder comprises side plates 23 and 24 connected by a top plate 25 and a bottom plate 26 having suitable flanges which are riveted to the plates 23 and 24. The plates 23 and 24 are provided at their ends with laterally extending flanges 27 and 28 which are riveted both to the vertical wall 6 and the web 9 of the side bars.

By reason of this construction a very rigid girder is provided which is adapted to withstand transverse, longitudinal and torsional strains.

A further feature of the invention consists in providing means by which a member, such as a brake actuating bar, may be passed through the vertical wall of the side bar at a relatively slight angle to the plane of the wall of the side bar without weakening the same for if the wall of the side bar was merely slotted to permit a rod or other member to pass through it at a relatively small angle to the plane of the side bar so great a slot would be required as to materially weaken the side bar.

In the preferred embodiment of the invention disclosed herein the wall 6 of each side bar is provided with an indented offset portion 29 which presents a recess 30 having an end wall 31 which extends at an abrupt angle to the plane of the wall 6. The wall 31 is provided with an aperture 32 through which a member, such as a brake rod 33 for a front wheel brake may pass at a relatively slight angle to the plane of the wall 6.

By reason of this construction the strength of the side bar is not diminished.

It will be understood that the embodiment of the invention disclosed herein is illustrative and not restrictive and that various changes in form, construction and arrangement of parts may be made within the spirit and scope of the following claims.

Having thus described my invention, what I claim as new, and desire to secure by Letters Patent, is:

1. A frame construction for vehicles comprising a pair of connected complementary metallic side bars having main channel portions and median offset portions comprising webs extending downwardly from the lower walls of the channels and provided with inwardly extending flanges.

2. A frame construction for vehicles comprising a pair of connected complementary metallic side bars having main channel portions and median offset portions comprising webs extending downwardly from the lower walls of the channels and provided with inwardly extending flanges the central portions of which lie in parallelism with the lower wall of the channel and the end portions of which incline toward and merge into said lower walls.

3. A frame construction for vehicles comprising a pair of connected complementary metallic side bars having main channel portions and median offset portions comprising webs extending downwardly from the lower walls of the channels and provided with inwardly extending flanges, and spring-supporting brackets secured to said channel portions provided with spring-clamping members extending beneath the lower walls of said channels into the spaces provided by said offset portions.

4. A frame construction for vehicles comprising a pair of complementary side bars having main channel portions and median offset portions comprising webs extending downwardly from the lower walls of said channel portions and provided with inwardly extending flanges and means connecting said side bars including a central rectangular tubular cross girder having its ends fitting upon and connected to said channel members and said offset portions.

5. A metallic side bar construction for vehicles comprising a plate presenting a vertical and a horizontal wall, a median offset portion comprising a web depending from said horizontal wall and a spring-supporting bracket secured to said plate provided with spring-clamping means extending beneath said horizontal wall into the space provided by said offset portions.

6. A metallic side bar construction for vehicles comprising a plate presenting a vertical and a horizontal wall and a median offset portion comprising a flanged web depending from said horizontal wall and having a horizontal central portion and inclined end portions merging into the horizontal wall of said plate.

7. A metallic side bar construction for vehicles comprising a plate having a vertical and a horizontal wall and an indented integral offset in said vertical wall having an aperture through its end and presenting a recess extending longitudinally of the plate adapted to permit the passage through said plate of a member having relatively small axial inclination to the plane of said vertical wall.

8. A frame construction for vehicles comprising a pair of complementary side bars each presenting a vertical and a horizontal wall and a median offset vertical web depending from said horizontal wall, the end portions of said web merging into said horizontal wall and a rectangular tubular cross girder having its ends fitting said vertical plate and web and provided with flanges connected to said vertical plate and web.

In testimony whereof, I have signed my name to this specification.

RALPH M. LOVEJOY.